United States Patent [19]

Caray

[11] 4,441,600
[45] Apr. 10, 1984

[54] DIAPHRAGM CLUTCH COVER ASSEMBLIES

[75] Inventor: André Caray, Paris, France

[73] Assignee: Valeo, Paris, France

[21] Appl. No.: 279,186

[22] Filed: Jun. 30, 1981

[30] Foreign Application Priority Data

Jul. 2, 1980 [FR] France .................. 80 14712

[51] Int. Cl.³ .................................... F16D 13/44
[52] U.S. Cl. ........................... 192/89 B; 192/70.27; 403/405
[58] Field of Search .................. 192/89 B, 70.27, 98, 192/99 A, 109 A; 403/408, 405, 329, 345; 411/525, 526, 528; 24/292–295

[56] References Cited

U.S. PATENT DOCUMENTS

| | | | |
|---|---|---|---|
| 2,225,394 | 12/1940 | Tinnerman | 24/295 |
| 3,069,963 | 12/1962 | Meyer | 24/295 |
| 4,039,059 | 8/1977 | Gennes | 192/89 B |
| 4,084,674 | 4/1978 | Gennes | 192/89 B |
| 4,200,176 | 4/1980 | Courbot | 192/89 B |

FOREIGN PATENT DOCUMENTS 1319636 1/1963 France .
2376969 1/1977 France .

Primary Examiner—Ernest R. Purser
Attorney, Agent, or Firm—Charles E. Brown

[57] ABSTRACT

A cover assembly for a diaphragm clutch is disclosed of the type comprising a plurality of stacked annular components: a cover, a diaphragm spring, a fulcrum ring and a reaction plate. The fulcrum ring is assembled on the cover by axial retaining tabs which extend through openings in the diaphragm spring and, for example, apertures in the fulcrum ring or in the cover. Resilient tongues or strikes are formed around the apertures or in the retaining tabs for transversely clamping the fulcrum ring relative to the cover. The arrangement permits assembly of the cover assembly by simple axial sliding engagement without having to bend over the ends of the retaining tabs after stacking the components. Alternatively, the retaining tabs and/or the resilient tongues may be formed in additional components fixed axially relative to the cover or the fulcrum ring, as desired.

18 Claims, 26 Drawing Figures

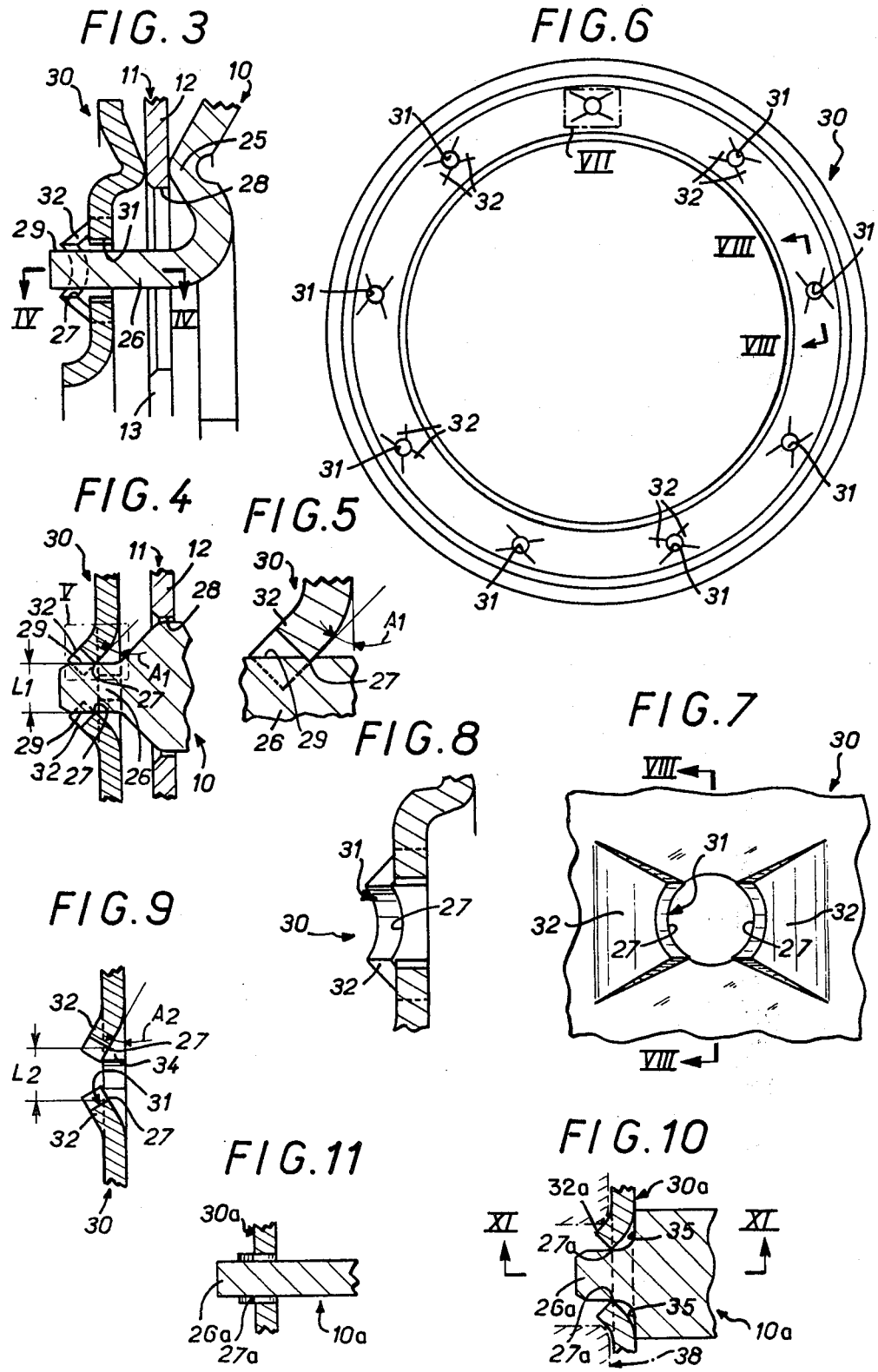

DIAPHRAGM CLUTCH COVER ASSEMBLIES

FIELD OF THE INVENTION

The present invention relates generally to diaphragm clutch cover assemblies for motor vehicles of the kind comprising a cover, a diaphragm spring having a Belleville washer outer peripheral portion and a central portion divided into radial fingers, assembly means rockably mounting the diaphragm spring on the cover, and a pressure plate fixed for rotation with the cover and mounted for limited axial movement relative to the cover, the Belleville washer outer portion of the diaphragm spring bearing against the pressure plate.

The cover assembly is mounted by the cover on a reaction plate of flywheel fixed for rotation with a first shaft, generally the driving shaft, a friction plate or driven disc being interposed between reaction plate and the pressure plate and fixed for rotation with a second shaft, generally the driven shaft. A clutch release bearing is arranged around the second shaft to cooperate with the radial fingers of the diaphragm spring for effecting disengagement of the clutch which in its normal position is engaged, the pressure plate normally clamping the friction plate against the reaction plate under the bias of the Belleville washer peripheral portion of the diaphragm spring.

The present invention relates more particularly to such cover assemblies in which the assembly means for rockably mounting the diaphragm spring on the cover comprise a fulcrum ring or beaded ring which is disposed on the side of the diaphragm spring remote from the cover and thin, flat retaining tabs having axial portions extending through openings in the diaphragm spring proximate to the radially outer ends of the fingers for attaching the fulcrum ring to the cover.

PRIOR ART

Usually the retaining tabs are formed in the cover and have bent-over portions against which the fulcrum ring bears. Such is, in particular, the case with U.S. Pat. Nos. 4,039,059 and 4,084,674 issued to the assignees of the present application, and to U.S. patent application Ser. No. 160,460 also assigned to the assignees of the present application.

Even though this arrangement has been found to be satisfactory it does have a drawback which is the necessity of bending the retaining tabs after assembling the various parts. The bending operation which produces the bent-over portions of the retaining tabs is a relative complex operation which requires special tool setup. The setup must develop a very high load of the order of 10 tons. In addition the desired amount of axial play in the stack or assembled parts requires calibrations which involve a complication of the tool setup.

Such a drawback is also found in the apparatus disclosed in French Pat. No. 1,319,636.

OBJECT AND SUMMARY OF THE INVENTION

An object of the present invention is the provision of a cover assembly which enables the retaining tab bending operation to be eliminated.

According to the invention, there is provided a diaphragm clutch cover assembly for a motor vehicle of the king comprising a cover, a diaphragm spring having a Belleville washer peripheral portion and a central portion divided into radial fingers, assembly means rockably mounting the diaphragm spring on the cover, a pressure plate fixed for rotation with the cover while admitting of limited axial displacement relative thereto, the Belleville washer outer portion of the diaphragm spring bearing against the pressure plate, the assembly means including a fulcrum ring disposed on the side of the diaphragm spring remote from the cover and retaining tabs extending through openings formed in the diaphragm spring proximate to the radially outer ends of the fingers and attaching the fulcrum ring to the cover. The cover assembly according to the invention is characterized by the retaining tabs being integrally formed with one of the cover and the fulcrum ring or bearing axially thereagainst, the retaining tabs being in simple axial engagement in apertures formed in the other of the cover and the fulcrum ring or in a retaining component formed by the other of the cover and the fulcrum ring or a component bearing axially thereagainst, tongues bearing against the contact surface being provided between the retaining tabs and the retaining component.

According to another aspect of the invention, the cover assembly is characterized by the retaining tabs being fixed axially relative to and associated with a selected one of the cover and the fulcrum ring, means defining aperture fixed axially relative to the nonselected one of the cover and the fulcrum ring for receiving the retaining tabs, tongues formed in a selected one of the means defining apertures and the retaining tabs resiliently engaging contact surfaces formed on the nonselected one of the means defining apertures and the retaining tabs and transversely clamping the latter for maintaining the fulcrum ring in a predetermined axial position relative to the cover against the forces exerted thereon by the diaphragm spring in the course of clutch operation.

For example, the retaining tabs may be integrally formed with the cover or bear axially against the cover, the fulcrum ring or an additional component bearing axially against the fulcrum ring, thus forming the retaining component associated with the retaining tabs. Alternatively, the retaining tabs may be integrally formed with the fulcrum ring or bear axially against the fulcrum ring, or an additional component bearing axially against the fulcrum ring thus forming the retaining component associated with the retaining tabs.

In conjunction therewith the resilient retaining tongue acting between each of the retaining tabs and the associated retaining component may either be part of such a retaining component or such a retaining tab, the contact surface with which such a bearing tongue retaining means cooperates being part of the retaining tab or the retaining component.

According to a first embodiment according to the invention, the retaining tongues bear by anchoring edges against the associated contact surfaces; in this case there is at least surface biting of the retaining tongues into the corresponding contact surfaces.

According to another embodiment of the invention, however, the retaining tongues bear by plane or flat surfaces against the associated contact surfaces; in this case there is no biting of the tongues into the associated contact surfaces but merely transverse clamping action. Clamping action is ensured and pressure is applied by the preloading and inherent resilience of the tongues.

In all embodiments according to the invention the fulcrum ring/cover attachment is accomplished by simple engagement or transverse clamping action as opposed to bending tabs.

There have, of course, already been proposed mechanical assemblies which are assemblable by simple engagement. But such cover assemblies whose components do not usually undergo any disassembling forces relative to one another, unlike the cover assembly whose cover and fulcrum ring are subjected in use to a substantial load tending to urge the fulcrum ring away from the cover.

It would not have occurred to one skilled in the art that by simple engagement which does not necessarily even involve anchoring the fulcrum ring could be secured relative to the cover, such an idea would have been systematically rejected by clutch designers. It was thus by going against the current of basic clutch design principles that simple engagement assembly concept was found to provide satisfactory attachment of the fulcrum ring relative to the cover.

It has been established that by the assembly engagement according to the invention it was possible to withstand an axial disassembly force considerably greater than 50 kg per retaining tab whereas in service the axial disassembling force is of the order of 10 to 15 kg per retaining tab.

In any event, the simple axial assembly engagement, according to the invention, permits the bending over of the retaining tabs after assembly of the parts to be eliminated and the engagement may be carried out without any particular operation or special calibration. Furthermore, the load required for this simple assembly operation is relatively small, of the order of 1.5 metric tons, and in any event considerably less than that presently required for bending the retaining tabs.

The features and advantages of the invention will be brought out in the description which follows given by way of example with reference to the accompanying diagrammatic drawings.

BRIEF DESCRIPTION OF THE DRAWINGS

FIG. 3 is an enlarged detail of the area included inside the phantom line box III in FIG. 2;

FIG. 4 is a fragmentary sectional view taken along line IV—IV in FIG. 3;

FIG. 5 is a detail on an even greater scale of the area included in the phantom line box V in FIG. 4;

FIG. 6 is an elevational view of a fulcrum ring used in the cover assembly of FIGS. 1 and 2;

FIG. 7 shows a detail on an enlarged scale of a portion of the fulcrum ring included in the phantom line box VII in FIG. 6;

FIG. 8 is a fragmentary cross-sectional view taken on line VIII—VIII in FIG. 7;

FIG. 9 is a view similar to that of FIG. 4 for the corresponding part of the fulcrum ring before assembling the same in the cover assembly;

FIG. 10 is a view similar to that of FIG. 4 for a modified embodiment;

FIG. 11 is a partial fragmentary cross-sectional view taken on line XI—XI in FIG. 10;

DETAILED DESCRIPTION OF THE PREFERRED EMBODIMENTS

Figure 1:
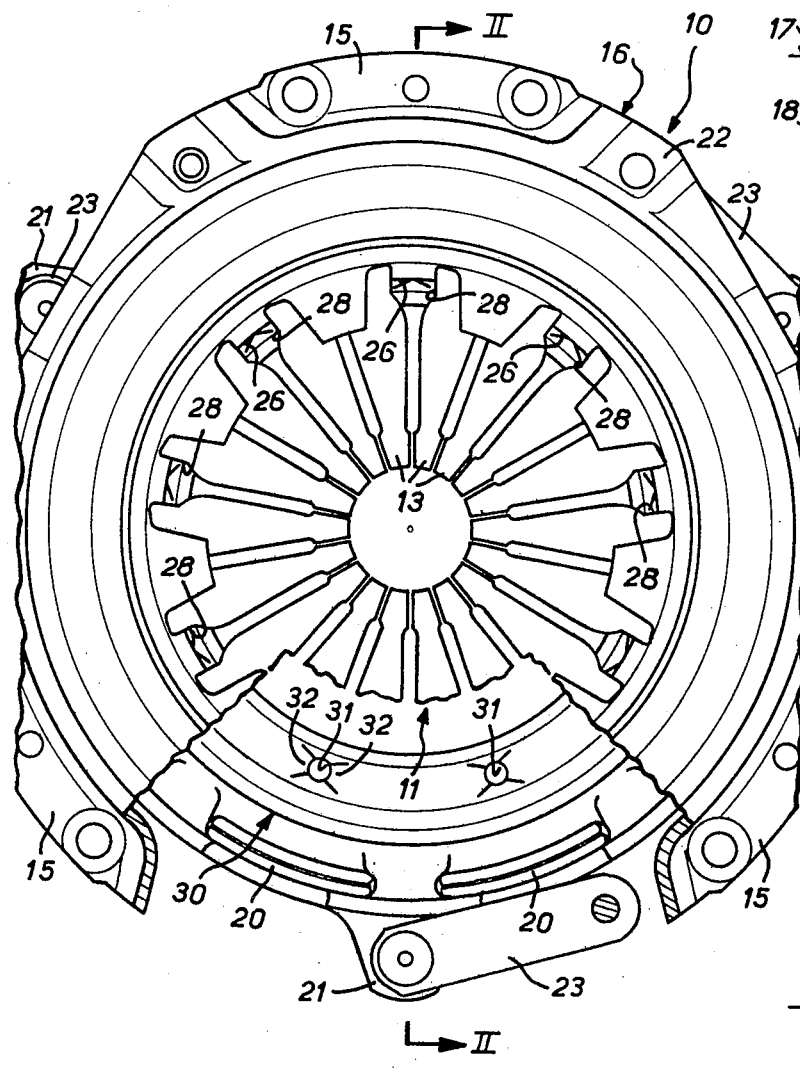
FIG. 1 is a fragmentary elevational view, with portions cut away, taken in the direction of arrow I in FIG. 2, of a diaphragm cover assembly embodying the invention.

According to the various embodiments of invention illustrated in the drawings, the diaphragm clutch cover assembly comprises a generally annular cover 10, a generally annular diaphragm spring 11 having a Belleville washer outer peripheral portion 12 and a central portion divided into a plurality of radial fingers 13, means for rockably mounting the diaphragm spring 11 on the cover 10, an annular pressure plate 14 fixed for rotation and admitting of slight axial displacement relative to the cover, the Belleville washer outer peripheral portion 12 of the diaphragm spring 11 bearing against the pressure plate 14.

Figure 2:
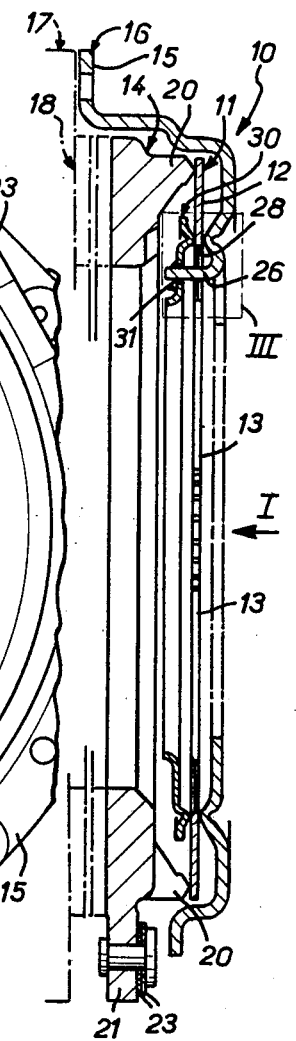
FIG. 2 is a cross-sectional view taken along line II—II in FIG. 1.

The cover 10 is adapted to be fixed to a reaction plate or flywheel 17 along lands 15 on a radial peripheral flange 16, the reaction plate 17 being shown in phantom lines in FIG. 2. The reaction plate 17 is fixed for rotation with a first shaft, which is the driving shaft in practice, with a friction plate or driven disc 18, also shown in phantom lines in FIG. 2, which is fixed for rotation with a second shaft which in practice is the driven shaft. The reaction plate 17 and the friction plate or driven disc 18 are part of the clutch but not the cover assembly.

The pressure plate 14 has circumferentially spaced axial bosses 20 against which the peripheral portion 12 of the diaphragm spring 11 bears. The pressure plate 14 also comprises radial lugs 21 spaced along the periphery thereof. Leaf springs 23 extend substantially tangentially between the lands 22 on the peripheral flange 16 of the cover 10 and the lugs 21 on the pressure plate 14 for fixing the pressure plate for rotation with the cover 10 while permitting slight axial displacement of the pressure plate 14 relative to the cover 10.

This arrangement which is well known per se and does not in itself constitute a novel feature of the invention and need not be described in greater detail.

The cover 10 defines a first or primary fulcrum 25 for the diaphragm spring 11 and more specifically the Belleville peripheral portion 12 thereof along the inner periphery of the cover 10, and in the illustrated embodiment the first fulcrum comprises an annular V-shaped bead, see FIG. 3.

The assembly means for rockably mounting the diaphragm spring 11 on the cover 10 comprise an annular fulcrum ring 30 which is a stamped profiled beaded ring disposed on the other side of the diaphragm spring 11 remote from the cover 10. The assembly means further comprise flat, thin retaining tabs 26 which are nine in number in the illustrated embodiment, which have axial portions which extend through openings 28 formed in the diaphragm spring 11 proximate to the radially outer ends of the fingers 13, i.e. adjacent the bights between the fingers, and which permit attachment of the fulcrum ring 30 to the cover 10.

In the embodiments of FIGS. 1-16 the retaining tabs 26 are integrally formed in one piece with the cover 10 by suitable bending and cutting. In addition, in these embodiments the bend line extends substantially tangentially relative to a circumference of the assembly; the retaining tabs 26 are relatively thin radially and relatively wide circumferentially.

The fulcrum ring 30 is inserted axially through its apertures 31 onto the retaining tabs 26 and is supported axially on the retaining tabs 26; the fulcrum ring 30 in turn bears against the peripheral portion 12 of the diaphragm spring on the side of the latter remote from the cover 10 and directly opposite the bead 25 formed in the latter.

According to the invention, each of the retaining tabs 26 is in simple axial engagement with the corresponding apertures 31 in the fulcrum ring 30 and for axially supporting the fulcrum spring 30 on the retaining tabs 26, resilient retaining tongues or strikes 32 bearing against contact surfaces 29 are provided in the associated apertures 31 between the retaining lugs 26 and the fulcrum ring 30. In the embodiment of FIGS. 1-9 the fulcrum ring itself defines a retaining component associated with the retaining tabs 26.

In other words the assembly means according to the invention comprise retaining tongues or strikes 32 transversely resiliently clamping the fulcrum ring 30 relative to the cover 10 thereby preventing the fulcrum ring 30 from being pulled away from its assembled position on the cover. Preferably, as described in detail below, the tongues or strikes 32 are so inclined as to oppose such a pulling away by a buttressing action exerted between the retaining tongues or strikes 32 and the retaining component.

In the embodiment of FIGS. 1-9, the contours of or the means defining the apertures 31 in the fulcrum ring 30 include at least two diametrically opposite retaining tongues or strikes 32 which extend at an angle from their attached ends axially away from the diaphragm spring 11 and their free ends have anchoring or biting edges 27 which bite into the associated contact surfaces 29 on the corresponding edges of the associated retaining tabs 26. In the embodiment of FIGS. 1-9, only two such retaining tongues or strikes 32 are provided per aperture 31 in the fulcrum ring 30 and from their attached ends to their free ends associated pairs of retaining tongues or strikes extend generally circumferentially toward each other.

Further, in the embodiment of FIGS. 1-9, each of the retaining tongues or strikes 32 has a generally trapezoidal configuration and the contours of the apertures 31 defined in part by the tongues or strikes 32 are generally circular, the anchoring or biting edge 27 being, in turn, part circular.

Thus, in the embodiment of FIGS. 1-9 the contours of the apertures 31 through the fulcrum ring 30 and the contours of the retaining tabs are different, the former being rectangular and the latter being circular; accordingly, each retaining tab 26 centers itself in the associated aperture 31 through the fulcrum ring 30.

In practice, each of the retaining tongues 32 defines an angle A1 relative to transverse plane perpendicular to the axis of the assembly which coincides with the general plane of the fulcrum ring 30 from which the tongues or strikes are formed. The angle A1 is between 20° and 70° and preferably in the vicinity of 45° (see FIGS. 4 and 5).

In fact, since the retaining tongues or strikes 32 are resiliently deformable they define in pairs in their rest or unloaded position before assembly (FIG. 9) throats 32 having internal openings L2 less than the corresponding dimension L1 of the retaining tabs 26. In the rest or unloaded position each of the retaining tongues or strikes 32 defines an angle A2 relative to the transverse plane perpendicular to the axis of the assembly which is less than the angle A1 defined above and is of the order of 30°.

In any event the retaining tabs 26 are generally rectangular at least beyond the diaphragm spring parallel to the axis of the assembly and are devoid of any bent-over portion or fold line beyond the fulcrum ring 30 relative to the diaphragm spring.

Preferably, as illustrated, the terminal ends of the retaining tabs are provided with chamfers along their circumferential edges to facilitate the axial engagement of the fulcrum ring on the retaining tabs.

In the course of engagement the retaining tongues or strikes 32 associated with each aperture 31 in the fulcrum ring 30 move away from each other against the force exerted by the insertion of the associated retaining tab 26, first elastically and then perhaps plastically and when the fulcrum ring is fully inserted the anchoring edges 27 of the retaining tongues or strikes 27 anchor themselves resiliently into the retaining tabs 26, the anchoring edges 27 being the edges formed on the ends of the retaining strikes or tongues axially closer to the diaphragm spring 11 (see FIGS. 4 and 5), in other words, the anchoring edges 27 bite at least superficially into the associated contact surfaces on the corresponding edges of the retaining tabs.

The axial support of the fulcrum ring 30 on the retaining tabs 26 is thus insured. This axial support and therefore the resistance to the fulcrum ring being pulled off or separated from the tabs is enhanced by the buttress effect of the retaining tongues or strikes when the diaphragm spring stresses the fulcrum ring, notably in the course of clutch disengagement. It will be noted in addition that the angle A1 (FIG. 5) defined above will have the tendency to become smaller in operation, thereby enhancing the sturdiness of the resulting assembly means.

In the alternative embodiment illustrated in FIGS. 10 and 11 each of the retaining tongues or strikes 32a of the fulcrum ring is generally rectangular in contour whereby the anchoring edges 27a are rectilinear rather than part circular. In addition, the retaining tabs 26a are flanged for bearing against the fulcrum ring 30a in practice, by means of pairs of transverse shoulders 35 at circularly spaced positions respectively on both sides of the retaining tabs 26a, the shoulders being spaced axially from the free ends of the tabs. The tool 38 used in inserting the retaining tabs into the apertures in the fulcrum ring 30a is shown in phantom lines in FIG. 10, the thrust being applied by the tool 38 continues until there is contact between fulcrum ring 30a and the shoulders 35 on the retaining tabs 26a.

In the foregoing description only part of the contour of the apertures 31a in the fulcrum ring 30a was defined by the free ends of the retaining tongues or strikes 32a the retaining tongues or strikes 32a extending either circumferentially or radially.

Figure 13:
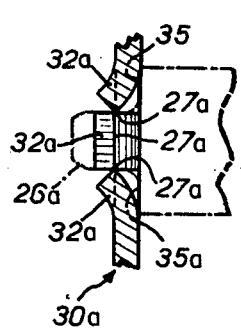
FIG. 13 is a cross-sectional view of the alternative embodiment taken on line XIII—XIII in FIG. 12.
Figure 12:
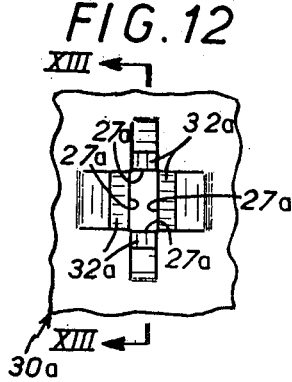
FIG. 12 is a view on a different scale similar to that of FIG. 7 relative to an alternative embodiment.
Figure 14:
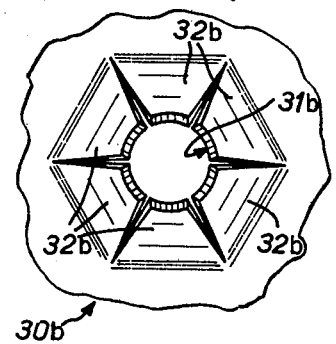
FIG. 14 is another fragmentary view similar to that of FIG. 7 for yet another embodiment.

In the embodiments of FIGS. 12-14, the entire contour of each of the apertures is defined by retaining tongues or strikes 32a and 32b. For example, in FIGS. 12 and 13 four retaining tongues or strikes 32a of generally rectangular shape having rectilinear anchoring edges 27a as in the embodiment of FIGS. 10 and 11, may be provided for biting into the four sides of the retaining tabs 26a when, as above, the retaining tabs are of rectangular cross section.

In the modified embodiment of FIG. 14, a larger number of retaining strikes or tongues 32b of generally trapezoidal configuration having part circular anchoring edges 27b are provided particularly for use when the retaining tabs are cylindrical pins of circular cross section.

Alternatively, the anchoring edges 27b of the rectangular tabs 32b may be part circular for defining circular apertures 31b whereas the anchoring edges 27b of the retaining tongues or strikes in the FIG. 14 may be rectilinear so as to define a polygon having five or more sides, a hexagon with six retaining tongues or strikes being shown in FIG. 14.

In all of the previous embodiments the fulcrum ring 30c itself defines the retaining component associated with the retaining tabs 26a and 26b, but this is not necessarily so.

Figure 15:
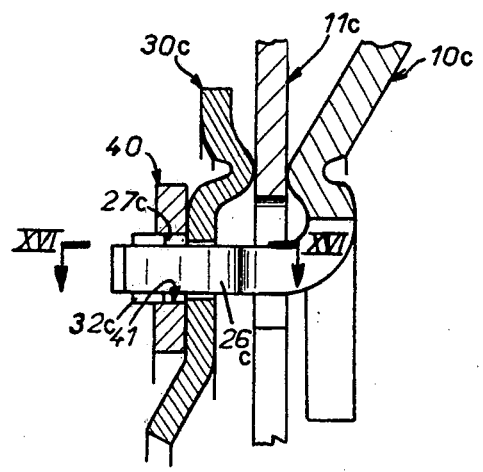
FIGS. 15 and 16 are fragmentary views similar to FIGS. 3 and 4, respectively, relative to another embodiment.
Figure 16:
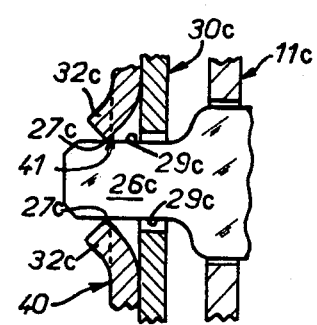

On the contrary, in FIGS. 15 and 16 the retaining component comprises an additional part 40 bearing axially against the fulcrum ring 30c, as shown it is an annular part adjacent the fulcrum ring 30c of comparable thickness to that of the fulcrum ring 30c, all of the retaining tabs being part of the same retaining component. Alternatively, however, individual retaining components may be associated with each of the retaining tabs 26c.

In any event, the retaining tongues or strikes 32c having anchoring edges 27c are formed on the additional components 40 for biting into the contact surfaces 29c and anchoring on the retaining tabs 26c. The retaining tongues or strikes 32c bordering each of the apertures 41 in the retaining component 40 are here, too, in simple axial engagement with the retaining tabs 26c.

In all the preceding embodiments the retaining tabs, 26a, 26b, and 26c are integrally formed in one piece with the cover 10. But in FIGS. 17-20 the retaining tabs are formed in one piece with the fulcrum ring, suitably stamped and bent. As illustrated the cover 10d and 10e itself defines the retaining component associated with the retaining tabs 26d and 26e, each of the retaining tabs being in simple axial engagement in its associated aperture 43e in the cover defined in part by at least two retaining tongues 32d and 32e having anchoring edges 27d and 27e such as shown in any of the preceding embodiments.

Alternatively, as above, the retaining component may be formed by an additional part bearing axially against the cover 10, the retaining tongues or strikes 32 then being formed therewith. This arrangement is not illustrated in the drawings.

Figure 17:
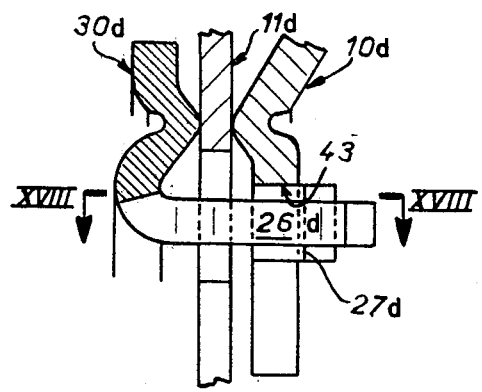
FIGS. 17 and 18 are fragmentary views similar to FIGS. 3 and 4 relative to the application of the present invention to another type of diaphragm clutch cover assembly.
Figure 18:
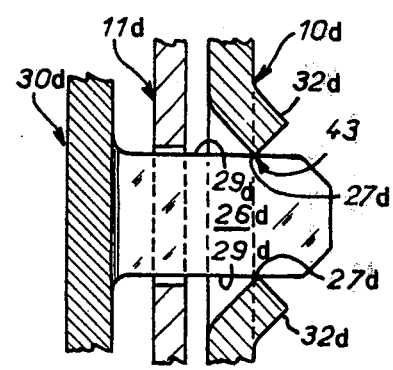

In FIGS. 17 and 18, as above, the retaining tongues or strikes 32d are formed as part of an associated retaining component which in this case is the cover 10d, the contact surfaces 29d with which the retaining tongues or strikes 32d cooperate being formed in the retaining tabs 26d which are formed integrally with the fulcrum ring 30d.

Figure 19:
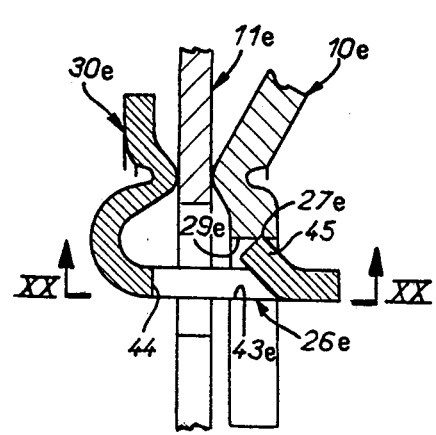
FIGS. 19 and 20 are fragmentary views similar to those of FIGS. 17 and 18 relative to a modified embodiment.
Figure 20:
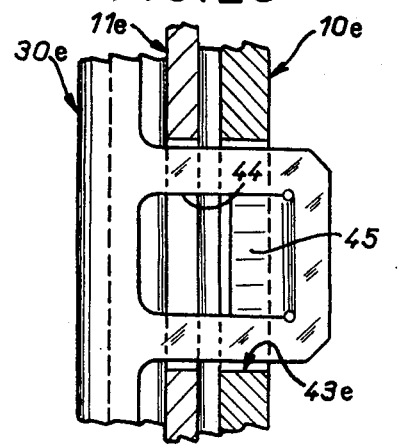

In the embodiment illustrated in FIGS. 19 and 20, the reverse arrangement is adopted: in each retaining tab 26e in a punched out area 44 a retaining tongue or strike 45 is bent angularly towards the diaphragm spring to project radially relative to the axially extending part of the associated retaining tab the ends of the retaining tab forming an anchoring edge 27e for biting into the contact surface 29e formed in the associated aperture 43e in the cover 10e with which the retaining tab 26e is in simple axial engagement. Alternatively, the retaining tongues or strikes 45 may project laterally as barbs from at least one of the circumferential edges of the retaining tabs 26e. This reverse arrangement may of course be employed in any of the preceding embodiments.

In the embodiments of FIGS. 21-26 which by way of example relate to the case where, as in the embodiment of FIGS. 1-9, the retaining tabs 26f and 26g are formed in one piece with the cover 10 and each is in simple axial engagement in an aperture 31f and 31g in the fulcrum ring 20f and 30g which is defined in part by two diametrically opposite retaining tongues or strikes 32f and 32g, each of the retaining tongues or strikes 32f and 32g bears through plane surface 50g against the associated contact surface 29f and 29g thus formed on the corresponding edge of the related retaining tab 26f and 26g.

Figure 21:
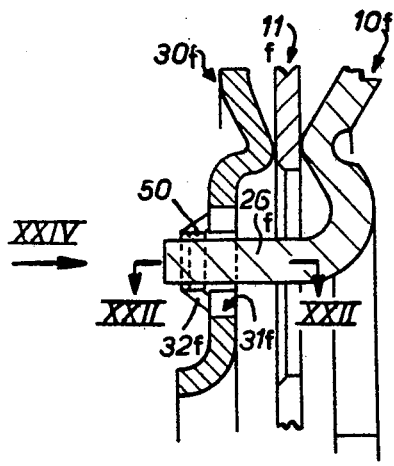
FIGS. 21 and 22 are fragmentary views similar to those of FIGS. 3 and 4 relative to another alternative embodiment.
Figure 24:
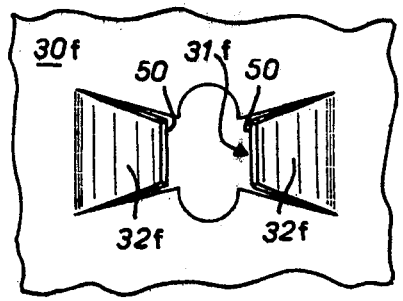
FIG. 24 is a fragmentary elevational view in the direction of the arrow XXIV in FIG. 21 of one of the component parts of the embodiment taken on its own.
Figure 22:
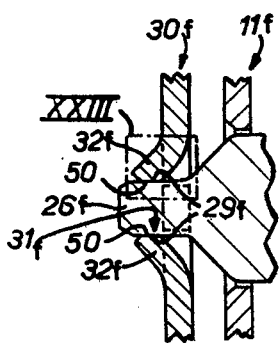
Figure 23:
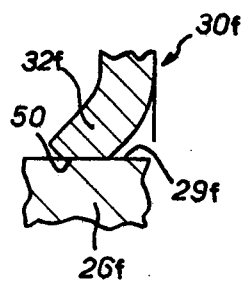
FIG. 23 is an enlarged scale detail of the area included in phantom line box XXIII in FIG. 22.
Figure 25:
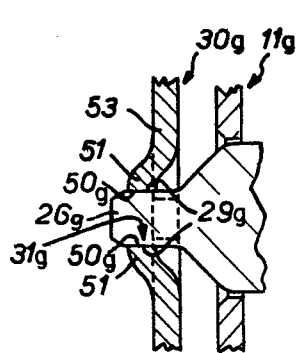
FIGS. 25 and 26 are views similar to those of FIGS. 22 and 23 relative to an alternative embodiment.
Figure 26:
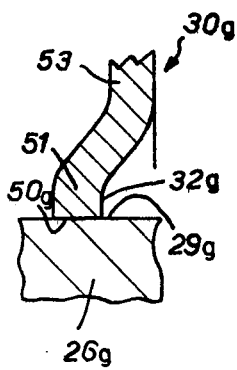

In the embodiment of FIGS. 21-23, as above, each of the retaining tongues or strikes is angularly inclined relative to the transverse plane perpendicular to the axis of the assembly. Alternatively, as shown in FIGS. 25 and 26, the terminal portions 51 of the tongues 32g extend perpendicularly to the axis of the assembly but axially offset relative to their attachment zones 53 with the rest of the fulcrum ring 30g.

In any event, the retaining tongues or strikes 32 are firmly held in contact with their associated contact surfaces by their inherent resilience and preload, and experience shows that such an arrangement offers at least as great security without the biting of the tongues or strikes into the tabs as the anchoring arrangements illustrated in the preceding embodiments. The clamping effect due to the inherent resilience of the retaining tongues or strikes developed between the tongues or strikes and the retaining tabs is increased by the buttressing action of the tongues or strikes when the diaphragm spring urges the fulcrum spring, notably, in the course of clutch disengagement.

Such nonbiting tongue or strike clamping action may of course be adopted in any of the preceding embodiments.

The present invention is, moreover, not limited to the various illustrated and described embodiments but is intended to encompass alternatives and modifications understood to those skilled in the art without departing from the spirit and scope of the appended claims.

In particular it is not necessary that the retaining tabs be integrally formed with the cover or the fulcrum ring. On the contrary, the tabs may be separate from the cover or fulcrum ring in which case the components defining the tabs bear axially against the cover or fulcrum ring thereby forming individual clips or when grouped together a single clip such as disclosed in the above identified U.S. Pat. Nos. 4,039,059 and 4,084,674 incorporated herein by reference, and more particularly the FIG. 13 embodiment thereof.

Instead of retaining tabs which are relatively thin in the radial direction and rather wide in the circumferential direction they may be relatively wide in the radial direction and relatively thin in the circumferential direction in which case the fold lines of the tabs would be substantially radially of the axis of the cover assembly.

Alternatively, the retaining tabs may, as referred to above with reference to the FIG. 14 embodiment, be of generally circular cross section fixed to or bearing axially against the cover or the fulcrum ring. In this case, the contour of the apertures in the fulcrum ring or the cover in which the retaining tabs or circular cross section are received may, as above, be of circular or rectangular shape.

Also, the fulcrum ring may, if desired, be formed as a split ring.

Furthermore, the field of use of the invention is not limited to a cover assembly which is separate entity adapted to be mounted on the flywheel in the embodiments described above but includes diaphragm clutches irrespective of the manner in which the various parts and components of the diaphragm clutch are assembled.

Likewise, the field of use of the invention is intended to include arrangements in which there is slight play defined between the primary and second fulcrums and the diaphragm spring as well as those in which the fulcrum ring is in resilient contact with the diaphragm spring at all times and there is no play between the diaphragm spring and the fulcrums.

Finally, the present invention is advantageously suited to reconditioning or rebuilding cover assemblies in which the original retaining tabs have bent-over portions. After the excess portions of the tabs are severed to gain access to the components of the clutch which were held by the bent-over tabs, the remaining axial parts of the tabs suffice for use in accordance with the present invention.

What I claim is:

1. A diaphragm clutch cover assembly for a motor vehicle of the kind comprising a cover, a diaphragm spring having a Belleville washer outer peripheral portion and a central portion divided into radial fingers, assembly means rockably mounting said diaphragm spring on said cover, a pressure plate fixed for rotation with said cover and admitting of limited axial displacement relative thereof, said Belleville washer outer peripheral portion bearing against said pressure plate, said assembly means including a fulcrum ring disposed on one side of said diaphragm spring remote from said cover and a plurality of retaining tabs extending through openings formed in said diaphragm spring proximate to radially outer ends of said fingers for attaching said fulcrum ring relative to said cover, the improvement wherein said retaining tabs are fixed axially relative to and associated with a selected one of said cover and said fulcrum ring, a plurality of means defining apertures fixed axially relative to the nonselected one of said cover and fulcrum ring for receiving said retaining tabs, tongues formed in a selected one of said means defining apertures and said retaining tabs resiliently engaging contact surfaces formed on the nonselected one of said means defining apertures and said retaining tabs and transversely clamping the latter for maintaining said fulcrum ring in a predetermined axial position relative to said cover against axial forces exerted thereon by said diaphragm spring in the course of rocking movement.

2. The cover assembly of claim 1, wherein said resilient tongues having anchoring edges biting into said contact surfaces.

3. The cover assembly of claim 2, wherein said anchoring edges are of part circular shape.

4. The cover assembly of claim 3, wherein said resilient tongues are formed in said means for defining said apertures, two said tongues being associated with each of said retaining tabs, the free ends of said resilient tongues bearing against said contact surfaces formed on said retaining tabs.

5. The cover assembly of claim 2, wherein said anchoring edges are rectilinear.

6. The cover assembly of claim 1, wherein said resilient tongues are formed in said means for defining said apertures and said contact surfaces are formed on said retaining tabs.

7. The cover assembly of claim 1, wherein said retaining tabs are inclined at angle between 20° and 70° relative to a transverse plane perpendicular to the axis of said assembly.

8. The cover assembly of claim 1, wherein said tongues have free ends substantially perpendicular to the axis of said assembly and axially offset relative to attachment zones of said tongues with said selected one of said means defining apertures and said retaining tabs.

9. The cover assembly of claim 4, 7 or 8, wherein throats defined by associated pairs of said resilient tongues in the unloaded condition of said tongues is smaller than the corresponding dimension of the corresponding retaining tab.

10. The cover assembly of claim 4, 7 or 8, wherein said tongues define only part of their associated apertures.

11. The cover assembly of claim 4, 7 or 8, wherein said tongues define the entire contour of their associated apertures.

12. The cover assembly according to claim 4, 7 or 8, wherein cross sections of said retaining tabs being different than contours of their associated means defining apertures, one group being circular and the other being rectangular.

13. The cover assembly of claim 20, wherein said tongues project radially from axial portions of said retaining tabs and are inclined toward said diaphragm spring.

14. The cover assembly of claim 1, wherein said retaining tabs have transverse shoulders.

15. The cover assembly of claim 1, wherein said retaining tabs are provided on a single component fixed axially relative to said selected one of said cover and said fulcrum ring and said plurality of means defining apertures are provided on single component fixed axially relative to said nonselected one of said cover and fulcrum ring.

16. The cover assembly of claim 1, wherein said tongues have terminal portions extending perpendicularly to the axis of said cover assembly and axially offset from the general plane of said fulcrum ring.

17. A diaphragm clutch cover assembly for a motor vehicle of the kind comprising a cover, a diaphragm spring having a Belleville washer outer peripheral portion and a central portion divided into radial fingers, assembly means rockably mounting said diaphragm spring on said cover, a pressure plate fixed for rotation with said cover and admitting of limited axial displacement relative thereof, said Belleville washer outer peripheral portion bearing against said pressure plate, said assembly means including a fulcrum ring disposed on one side of said diaphragm spring remote from said cover and retaining tabs extending through openings formed in said diaphragm spring proximate to radially outer ends of said fingers for attaching said fulcrum ring relative to said cover, the improvement wherein said retaining tabs are fixed axially relative to and associated with a selected one of said cover and said fulcrum ring, means defining apertures fixed axially relative to the nonselected one of said cover and fulcrum ring for receiving said retaining tabs, tongues formed in a selected one of said means defining apertures and said retaining tabs resiliently engaging contact surfaces formed on the nonselected one of said means defining apertures and said retaining tabs and transversely clamping the latter for maintaining said fulcrum ring in a predetermined axial position relative to said cover against axial forces exerted thereto by said diaphragm spring in the course of rocking movement, wherein said tongues have planar free end surfaces in engagement with said contact surfaces formed on the associated retaining tabs which are also planar, each of said tongues being angularly inclined relative to a transverse plane perpendicular to the axis of said cover assembly.

18. A diaphragm clutch cover assembly for a motor vehicle of the kind comprising a cover, a diaphragm spring having a Belleville washer outer peripheral portion and a central portion divided into radial fingers, assembly means rockably mounting said diaphragm spring on said cover and admitting of limited axial displacement relative thereof, said Belleville washer outer peripheral portion bearing against said pressure plate, said assembly means including a fulcrum ring disposed on one side of said diaphragm spring remote from said cover and retaining tabs extending through openings formed in said diaphragm spring proximate to radially outer ends of said fingers for attaching said fulcrum ring relative to said cover, the improvement wherein said retaining tabs are fixed axially relative to and associated with a selected one of said cover and said fulcrum ring, means defining apertures fixed axially relative to nonselected one of said cover and fulcrum ring for receiving said retaining tabs, tongues formed in a selected one of said means defining apertures and said retaining tabs resiliently engaging contact surfaces formed on the non-selected one of said means defining apertures and said retaining tabs and transversely clamping the latter for maintaining said fulcrum ring in a predetermined axial position relative to said cover against axial forces exerted thereon by said diaphragm spring in the course of rocking movement, said tongues being formed on said retaining tabs, and said contact surfaces being formed on said means, defining apertures in which said retaining tabs are received.

* * * * *